United States Patent [19]

Busam et al.

[11] Patent Number: 4,647,721
[45] Date of Patent: Mar. 3, 1987

[54] TELEPHONE ACTIVATED POWER CONTROLLER

[75] Inventors: Vincent A. Busam, Los Gatos; James C. Bell, Scotts Valley; Wayne T. Holcombe, Palo Alto, all of Calif.

[73] Assignee: Dynatech Computer Power, Inc., Scotts Valley, Calif.

[21] Appl. No.: 713,779

[22] Filed: Mar. 19, 1985

[51] Int. Cl.[4] .......................................... H04M 11/00
[52] U.S. Cl. ...................................... 379/102; 379/93
[58] Field of Search ........................................ 179/2 A

[56] References Cited

U.S. PATENT DOCUMENTS

| | | | |
|---|---|---|---|
| 4,021,615 | 5/1977 | James et al. | 179/2 A |
| 4,097,690 | 6/1978 | Kontz et al. | 179/2 A |
| 4,122,305 | 10/1978 | Fish et al. | 179/2 A |
| 4,467,144 | 8/1984 | Wilkerson et al. | 179/2 A |

Primary Examiner—Gene Z. Rubinson
Assistant Examiner—David R. Schuster
Attorney, Agent, or Firm—Thomas E. Schatzel

[57] ABSTRACT

A telephone activated power controller comprised of an electrical power inlet and a number of power outlets for supplying power to the devices of a computer or other system. A detection circuit detects telephone rings and off-hook conditions and powers up the system. A remote control circuit allows the computer to keep the power on after hang-up or manual power-off. A status sensor circuit tells the computer if the device has been turned on manually or remotely. An inhibit circuit prevents the device from responding to a telephone ring or off-hook condition if it is engaged. The controller also has a surge protection circuit to prevent large voltages or current from reaching the power outlets.

21 Claims, 2 Drawing Figures

Fig_1

TELEPHONE ACTIVATED POWER CONTROLLER

BACKGROUND OF THE INVENTION

1. Field of the Invention

This invention relates generally to telephone activated power control devices and more specifically, to such devices for use with microcomputer systems.

2. Description of the Prior Art

Microcomputers have become increasingly popular in the business office. Businesspeople have become more dependent upon microcomputers to manage their information. The usefulness of microcomputers is increased still further by adding a modem to allow the computer to transfer and receive information over telephone lines with other microcomputers or terminals at remote locations. For example, a businessperson on a trip to a distant city can call his/her office microcomputer at any time of the day. By using a portable computer, the person can commuicate with the office microcomputer to check messages, to send memos or to transfer programs or data files.

The flexibility of being able to communicate with an office microcomputer at any time or place does have its drawbacks. In order for the microcomputer system to be able to answer telephone calls, it must be continuously left with the power on. If a telephone call is expected in the evening, this may mean leaving the computer system on all night. The microcomputers are left running for long periods of time without being used. This results in increased energy expenses and decreased computer life.

SUMMARY OF THE PRESENT INVENTION

It is therefore an object of the present invention to provide a telephone activated power controller for turning on power to a computer system in response to a telephone ring signal.

It is a further object of the present invention to provide a telephone activated power controller which turns on power to a computer system when a telephone line is off-hook and turns off power when the telephone line is on-hook.

It is another object of the present invention to provide a telephone activated power controller which allows the modem to refrain from answering the telephone until the entire computer system is up and running.

It is a further object of the present invention to provide a telephone activated power controller which allows the computer system to stay on after manual turn-off or the telephone goes on-hook to complete required processing and then allow the computer system to shut itself off.

In an exemplary embodiment of the present invention, the device comprises an electrical power inlet and a number of power outlets for supplying power to the parts of the computer system such as the CPU, monitor, modem, etc. A power surge protection circuit is provided to limit damaging power surges to the computer system. One of the power outlets is connected to a power sensor circuit which sends a signal to a power control circuit to power up the rest of the outlets if power is detected. This allows the entire computer system to be powered up by turning on one device, such as the monitor.

The present invention also has a telephone inlet for connection to a telephone line and an outlet for connection to a modem. When the telephone rings, or the modem is off-hook, a detector circuit sends a signal to the power control circuit to power up the power outlets for the computer system and after a short delay, allows the modem to answer the telephone. The invention can be connected directly to the computer via a cable connection. A remote control circuit allows the computer to keep the power on after hang-up or manual turn-off. A status sensor circuit tells the computer if the device has been turned on manually or remotely. An inhibit circuit, when engaged, prevents the device from responding to a telephone ring or off-hook condition. An indicator light circuit indicates to the user that the computer system has been remotely turned on.

An advantage of the present invention is that it provides a telephone activated power controller for turning on power to a computer system in response to a telephone ring signal.

A further advantage of the present invention is that it provides a telephone activated power controller which turns on power to a computer system when a telephone line is off-hook and turns off power when a telephone line is on-hook.

Another advantage of the present invention is that it provides a telephone activated power controller which allows the modem to refrain from answering the telephone until the entire computer system is up and running.

A further object of the present invention is that it provides a telephone activated power controller which allows the computer system to stay on after manual turn-off or telephone hang-up to complete required processing and then allows the computer to shut itself off.

Another advantage of the present invention is that it provides power surge protection to the entire computer system.

A further advantage of the present invention is that it has a telephone inhibit capability that, if activated, prevents the computer from being turned on when the telephone rings or the modem is off-hook.

Another advantage of the present invention is that it has a status indicator which indicates if the computer has been turned on remotely.

These and other objects and advantages of the present invention will no doubt become obvious to those of ordinary skill in the art after having read the following detailed description of the preferred embodiment which is illustrated in the various drawing figures.

IN THE DRAWING

FIG. 1 is a diagram of a telephone activated power controller when used in a computer system; and FIG. 2 is a circuit diagram of a telephone activated power controller in accordance with the present invention.

DETAILED DESCRIPTION OF THE PREFERRED EMBODIMENT

Figure 1:
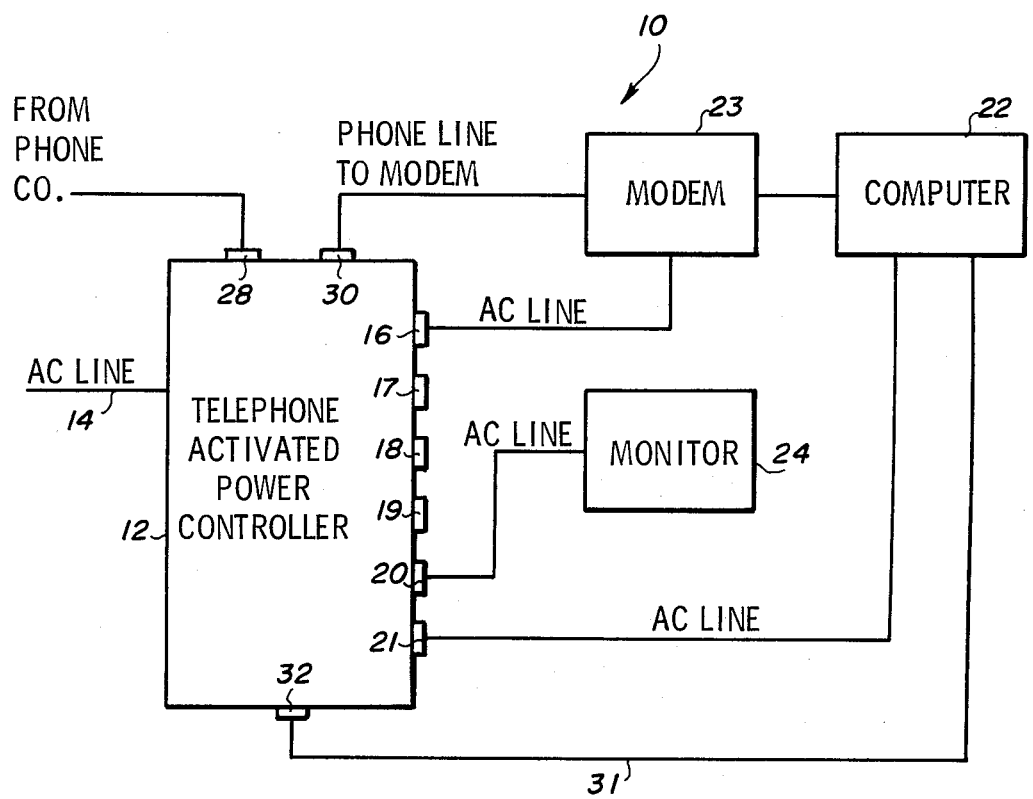

FIG. 1 illustrates a diagram of a telephone activated power controller when used in a computer system and is referred to by the general reference character 10. The telephone activated power controller 12 receives electrical power along power line 14. The power controller 12 has a plurality of six power outlets 16, 17, 18, 19, 20 and 21 for providing power to the devices in a computer system such as a computer 22, a monitor 24, and a modem 23. The power controller 12 is connected to the telephone line at telephone inlet 28 and is connected to the modem 23 at telephone outlet 30. The power controller 12 is also connected to the computer 22 by a control cable 31 at control cable connection 32.

In operation, the power controller 12 has a number of ways to switch power to the computer system. Power outlet 20 is a sense outlet. If the monitor 24 plugged-in to power outlet 20 is turned on, then the power controller 12 will immediately supply power to power outlets 16–19, and after approximately a two second delay, will turn-on power to power outlet 21 to provide power for the computer 22. If a telephone ring signal is detected on telephone inlet 28, or if an off-hook condition from the modem 23 is detected on telephone outlet 30, then the power controller 12 will provide power to the power outlets 16–19 after a short delay, and after an additional second delay, to power outlet 21. The power controller 12 will disconnect power after a delay of five to ten seconds to power outlets 16–19 and 21 when an on-hook condition is detected at telephone outlet 30. The computer can signal the power controller 12 at control cable connection 32 to keep the power on after the modem 23 has gone on-hook so that the computer system can finish its processing, and then the computer 22 can notify power controller 12 to turn the power off.

Figure 2:
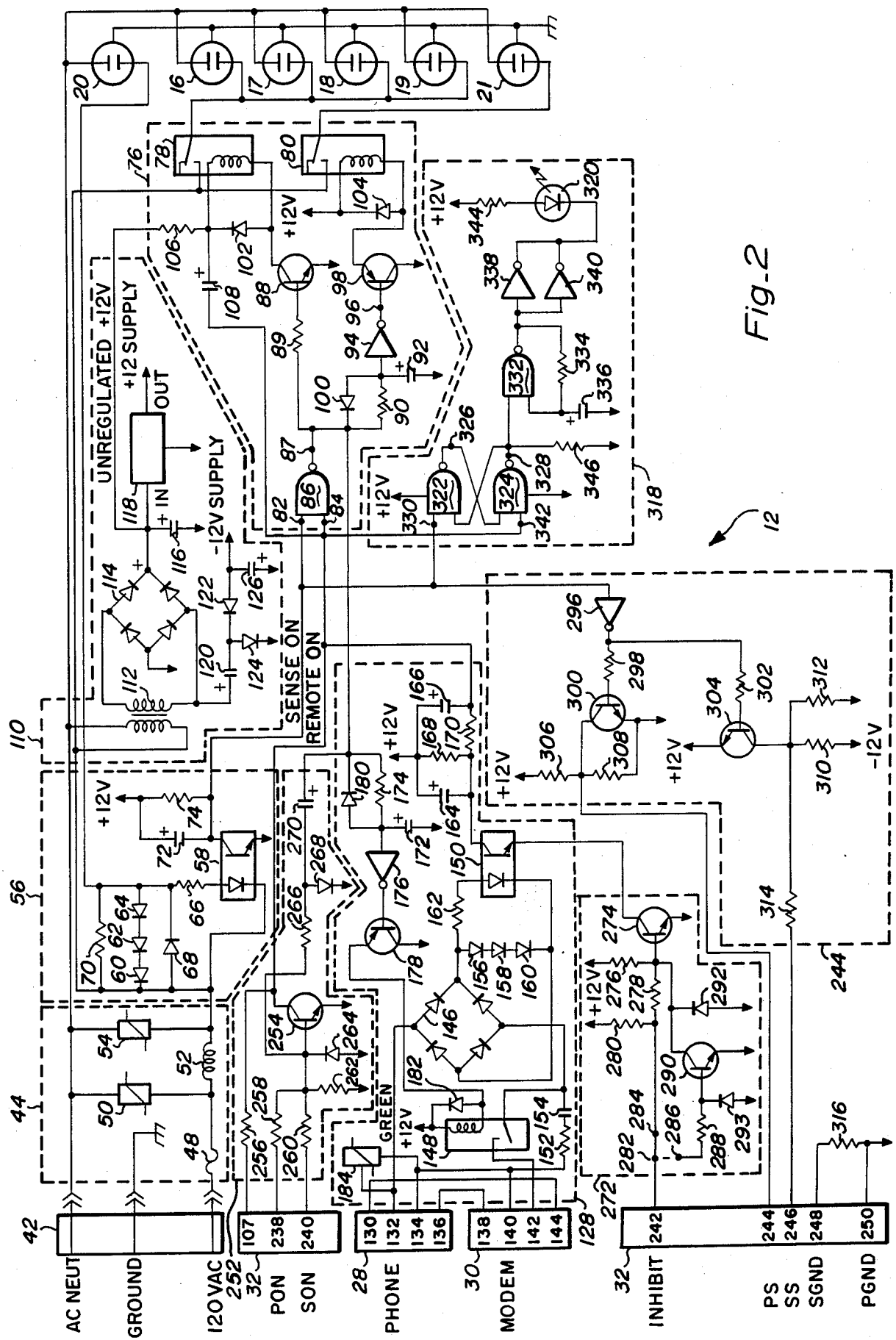

FIG. 2 illustrates a circuit diagram for the telephone activated power controller 12 of the present invention. Electrical power, 120 volts A.C., 50–60 hertz, enters the power controller 12 through a standard three-pronged plug 42. A power surge protection circuit 44 has the capability to suppress approximately fifty joules. Fuse 48 is a ten amp fuse and protects against fire. Varistor 50 is connected across the A.C. input and acts as stage one of the suppression network. The varistor 50 is a relatively fast acting shunt that has a maximum clamping voltage of 340 volts and 35 joules of energy absorption. Stage two, the in-line power choke inductor 52, supplies 50 u.H. of inductance to limit high current surges. Stage three is varistor 54 which provides a second voltage clamping stage, so that the resultant suppression capability of the power surge protection circuit 44 is 50 joules.

The electrical power is then sent to the power outlets 16–21. The sense power outlet 20 always has power applied to it. The return leg of the sense power outlet 20 is connected to a current sensor circuit 56.

The current sensor circuit 56 provides a power-on signal output when more than five watts of power is detected at sense power outlet 20. Optical-isolator 58 provides the power-on signal output and isolates the circuit lines so that there is no direct current path. Diodes 60, 62 and 64 provide an asymmetrical current shunt. A resistor 66 limits the current flowing to the optical-isolator 58 so that it is not damaged. A diode 68 limits the voltage across diodes 60, 62 and 64. A resistor 70 sets the minimum current threshold required to power-on the device. A voltage drop across diodes 60 through 64 causes current flow through the light emitting diode of the optical-isolator 58. The transistor section of the optical-isolator 58 begins to conduct and charge the low pass filter capacitor 72. A resistor 74 provides voltage pull-up. The resulting low voltage power-on signal is sent to a power control circuit 76.

The power control circuit 76 controls power relays 78 and 80 which in turn provide AC power to the power outlets 16, 17, 18, 19 and 21. A low voltage signal applied at a pin 82 or 84 at a NAND gate 86 will force pin 87 to +12 volts. NAND gate 86 is a Schmitt trigger. The +12 volt signal from NAND gate 86 turns on a NPN transistor 88. A resistor 89 provides isolation for the transistor 88. Power relay 78 is turned on and AC power is supplied to power outlets 16, 17, 18 and 19.

The power outlet 21 is used for the CPU and power on to power outlet 21 is delayed for system protection. When NAND gate 86, pin 87, goes to +12 volts, a RC network composed of a resistor 90 and a capacitor 92 starts to charge to +12 volts. After one time constant (2.2 seconds), an inverting gate 94 reaches its positive threshold and switches a pin 96 to low volts. A PNP transistor 98 is turned on and supplies the low voltage level required to switch power relay 80 on and supply AC power to power outlet 21.

The power control circuit 76 is turned off when the low voltage signal is removed from pins 82 or 84. Pin 87 goes to low volts. Transistors 88 and 98 are switched off which in turn switches off power relays 78 and 80 and removes power from power outlets 16, 17, 18, 19 and 21. A diode 100 provides a fast discharge path for capacitor 92. A diode 102 and a diode 104 protect transistors 88 and 98 from flyback by absorbing stored magnetic energy when the transistors are turned off by shunting flyback voltage. A resistor 106 drops some unregulated voltage so that the power relay 78 does not overheat. There are problems of instability with the system because computer 22 may momentarily generate a power-on signal at a pin 107 on control cable connection 32 immediately after the controller 12 has been switched off. A capacitor 108 solves this problem by causing a slight hysteresis delay in the application of the low volt signal at pin 84.

A power supply circuit 110 supplies a +12 volts regulated, a +12 volts unregulated, and a −12 volts unregulated to the rest of the controller 12. The maximum current capacity is 350 milliamps. The total current draw for the controller 12 is approximately 30 milliamps minimum and 150 milliamps maximum. A transformer 112 steps the 120 volts AC input down to 12.6 volts AC and 350 milliamps current capacity output. A full-wave bridge rectifier 114 rectifies the output of transformer 112. A capacitor 116 provides an unregulated +14 to +16 volts DC source. A three terminal regulator 118 outputs a +12 volts DC source for the controller 12 logic circuits. A capacitor 120 is charged with the negative swing of the output of transformer 112. A diode 122 and a diode 124 are used in conjunction with a capacitor 126 to provide an unregulated −12 volts DC supply.

A detection circuit 128 detects ring signals and off-hook conditions. The telephone line from the wall is plugged-in to telephone inlet 28. The telephone inlet is connected in parallel to the telephone outlet 30 except for a tip line 132 and a ring line 134. The tip line 132 is connected in series to a full-wave bridge rectifier 146 and a lock-out relay 148. The rectifier 146 is used to rectify the AC ring voltage and provide an off-hook current path for an optical-isolator 150. The ring line 134 is connected to a ring load consisting of a resistor 152 and a capacitor 154. When there is a ring signal, the ring load causes current to flow through rectifier 146. The output from rectifier 146 flows through a limiting network composed of a diode 156, a diode 158, a diode 160, and a resistor 162. The limiting network insures that at low levels, most current goes to the optical-isolator 150 and at high levels it shunts.

When optical-isolator 150 is turned on a RC network consisting of a capacitor 164, a capacitor 166, a resistor 168 and a resistor 170 discharges toward low volts. This low-pass filter eliminates spurious signals resulting from the on/off ring signal. The resultant low voltage signal is sent to pin 84 of the power control circuit 76 which turns on power at power relays 78 and 80. When the telephone goes back on-hook or the ring signal ceases, the low pass filter starts to charge to +12 volts. The time to charge to the high threshold of NAND gate 86 is approximately five to ten seconds, at which time the relays 78 and 80 are switched off.

Relay 148 is used to solve the problem of modem instability. If the modem is powered up and shown the ring signal at the same time, it may answer the telephone in an unstable state and have to drop the connection. Relay 148 locks out the modem attached to telephone outlet 30 until approximately three to four seconds after the CPU has been turned on. A delay circuit consisting of a capacitor 172 and a resistor 174 charge to the threshold voltage of an inverting gate 176 when pin 87 of NAND gate 86 goes to +12 volts. Inverting gate 176 then turns on a PNP transistor 178 which drives relay 148. A diode 180 provides a fast discharge path for the reverse direction. A diode 182 protects transistor 178 from flyback. A varistor 184 protects the modem or other device plugged-in to telephone outlet 30 and the detection circuit 128 from voltage surges in the telephone line.

The control cable connector 32 with pins 107, 238, 240, 242, 244, 246, 248 and 250 provides a direct connection via a control cable to an RS232 or parallel input-/output port on the computer. A remote control circuit 252 attached to connector 32 enables the computer to remain on after manual power off or telephone hang-up. The parallel on signal, pin 238, and the serial on signal, pin 240, are used to turn the controller 12 on. Asserting a +5 volt signal on pin 238 or a +12 volt signal on pin 240 causes a NPN transistor 254 to turn on and causes a zero voltage signal to be delivered to pin 84. Asserting a low voltage at pin 107 would also send a power-on signal to pin 84. A protection network is composed of a resistor 256, a resistor 258, a resistor 260, a resistor 262 and a diode 264. A resistor 266, a diode 268 and a capacitor 270 form a hysteresis circuit to insure that the controller 12 will stay off when it is switched off. Computer systems when powered off have stored power which takes time to dissipate. The hysteresis circuit absorbs these erratic signals and prevents transistor 254 from turing the power on.

The cable connector 32 is also attached to an inhibit circuit 272 which can prevent automatic power-on due to telephone activity at selected times. The inhibit line, pin 242, controls the current path of the telephone circuit, optical-isolator 150 of detection circuit 128. A low voltage signal on pin 242 turns a transistor 274 off and thereby inhibits optical-isolator 150 from transferring a low voltage signal to pin 84 in response to a telephone ring or off-hook condition. A resistor 276 keeps transistor 274 turned on in the absence of a low voltage signal from pin 242. A resistor 278 and a resistor 280 protect transistor 274 from transients and large voltages.

The inhibit signal can be reversed from a low voltage to a positive voltage signal by changing the setting of a jumper 282. If jumper 282 is set at pin 284, then a low voltage signal will turn transistor 274 off as described above. If jumper 282 is set at pin 286 then a positive voltage flowing through a resistor 288 will turn on an inverting transistor 290 which turns off transistor 274. A diode 292 shunts large negative signals. A diode 294 and resistor 288 form a protective network.

A status sensor circuit 294 is attached to cable connector 32 at pins 244 and 246. Status sensor 294 informs the computer whether or not the controller 12 was turned on manually via power sensor outlet 20. A low voltage signal from the current sensor circuit 56 is sent to an inverting gate 296. Inverting gate 296 inverts the signal and sends it through a resistor 298 to a NPN transistor 300 and through a resistor 302 to a PNP transistor 304. Transistor 300 is turned on and sends a low voltage signal to pin 244. Pin 244 is a parallel interface line. When transistor 300 is off, a +5 volt signal is sent to pin 244. A resistor 306 provides voltage pull-up. A resistor 308 is a voltage divider. Transistor 304 is turned off and sends a −12 volts to pin 246 when the current sensor circuit 56 is on. Pin 246 is a serial interface line. When the current sensor circuit 56 is off, pin 246 receives a +12 volts signal. A resistor 310 provides voltage pull-down. A resistor 312 and a resistor 314 provide voltage protection. A resistor 316 provides sufficient ground return so that the serial port of an IBM personal computer will work.

An indicator circuit 318 is used to indicate to the user whether the power in the controller 12 is on and whether the controller 12 has been turned on remotely. A LED 320 is controlled by the state of a flip-flop formed by using a NAND gate 322 and a NAND gate 324. NAND gates 322 and 324 are Schmidt triggers. A pin 326 is the set side and a pin 328 is the reset side of the flip-flop. A low voltage input on a pin 330 sets the flip-flop and disables an oscillator network composed of a NAND gate 332, a resistor 334, and a capacitor 336. This causes a LED driver network, composed of an inverting gate 338 and an inverting gate 340, to hold LED 320 in a steady state ON condition. A low voltage input on pin 342 resets the flip-flop and causes the oscillator network to blink the LED 320 at about two cycles per second. Concurrent low voltage levels at pins 330 and 342 will cause LED 320 to blink. A resistor 344 is used as a current limit. A resistor 346 insures that the flip-flop is in a steady state on initial power up. A steady state indicates power is on and no remote on condition was detected. A blinking LED 320 indicates either an incoming telephone call or external stimulus at the cable connector 32 caused the power relays 78 and 80 to switch on. The blinking state is reset by the low voltage signal from the current sensor circuit 56.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A telephone activated power controller comprising:
   a power input means for receiving electrical AC power;
   a power output means connected to the power input means for supplying electrical AC power to output devices;
   a telephone input means for receiving signals generated by outside telephonic systems;

a telephone output means for delivering telephonic signals to said output devices;

a power control means connected intermediate the power input means and the power output means for controlling the flow of power from the power input means to the power output means and for disrupting said power flow responsive to a power-on or power-off signal, the power control means including a NAND gate for receiving the power-on and power-off signals and for sending relay signals responsive to said power-on and power-off signals, a relay connected intermediate the power input means and the power output means for switching on and off power from the power input means to the power output means, a transistor connected to said relay for controlling said relay responsive to said relay signals, a resistor connected intermediate said NAND gate and said transistor for providing transistor isolation, a diode connected in parallel with said relay for shunting stored magnetic energy when said relay is turned off, a resistor connected intermediate the power supply means and said relay for protecting said relay from overheating, and a capacitor connected intermediate said relay and said NAND gate for delaying the reception of a power-on signal at said NAND gate to prevent instability;

a detection means connected to the telephone input means, telephone output means, and the power control means for detecting a ring signal from the telephone input means or an off-hook condition from the telephone output means and for delivering a power-on signal to the power control means responsive to said ring signal or said off-hook condition and for providing a connection between the telephone input means and the telephone output means and for delivering a power-off signal to the power control means responsive to an on-hook condition from the telephone output means; and a power supply means connected to the power input means for providing a plurality of power levels.

2. A telephone activated power controller comprising:

a power input means for receiving electrical AC power;

a power output means connected to the power input means for supplying electrical AC power to output devices;

a telephone input means for receiving signals generated by outside telephonic systems;

a telephone output means for delivering telephonic signals to said output devices;

a power control means connected intermediate the power input means and the power output means for controlling the flow of power from the power input means to the power output means and for disrupting said power flow responsive to a power-on or power-off signal;

a detection means connected to the telephone input means, telephone output means, and the power control means for detecting a ring signal from the telephone input means or an off-hook condition from the telephone output means and for delivering a power-on signal to the power control means responsive to said ring signal or said off-hook condition and for providing a connection between the telephone input means and the telephone output means and for delivering a power-off signal to the power control means responsive to an on-hook condition from the telephone output means; and a power supply means connected to the power input means for providing a plurality of power levels;

a computer interface means for allowing signals to pass between a computer and the device;

a remote control means connected to the computer interface means and the power control means for sending a power-on or power-off signal to the power control means responsive to a computer signal;

a sense power output means connected to the power input means for supplying electrical AC power to other devices such as units of a computer system;

a power sensor means connected intermediate the power input means and the sense output means for detecting the flow of power from the power input means to the sense power output means and for delivering a turn-off signal to the power control means responsive to the termination of said flow of power, the power sensor means comprising an optical-insolator connected intermediate the power input means and the sense power output means for detecting the flow of power from the power input means to the sense power output means and for delivering a responsive power-on signal to the power control means, a limiting network comprised of a plurality of diodes connected parallel to said optical-insolator and a resistor connected intermediate said optical-isolator and said diodes, for limiting the current flow to said optical-isolator, a diode connected in parallel with said optical-insolator for limiting the voltage, a resistor connected parallel to said optical-isolator for setting a minimum current threshold for said optical-isolator, and a low pass filter connected intermediate said optical-isolator andd the power control means for limiting narrow transients.

3. The device of claim 2 further including, a status sensor means connected to the power supply means, the computer interface means, and the power sensor means for sensing a power-on signal from the power sensor means and delivering a status signal to the computer interface means; and an inhibit means connected to the power supply means, the computer interface means, and the detection means for receiving an inhibit signal from the computer interface means and preventing the detection means from sending a power-on signal to the power control means.

4. The device of claim 3 further including, a surge protection means connected intermediate the power input means and the power output means for limiting the amount of power flowing from the power input means.

5. The device of claim 4 further including, an indicator means connected to the power supply means, the power sensor means, the detection means and the remote control means for providing the user with a visual indication of whether the device is on or off and whether the power output means were last turned on manually by the power sensor means or remotely by the detection means or remote control means.

6. The device of claim 1 wherein the power control means further comprises, a delayed power output means connected to the surge protection means for supplying electrical AC power to other devices such as a computer, a delay relay connected intermediate the power input means and said delayed power output means for switching on and off power from the power input means to the delay power output means;

a delay transistor connected to said delay relay for controlling said delay relay responsive to said relay signals;

an inverting gate connected intermediate said NAND gate and said delay transistor for receiving said relay signals and controlling said delay transistor responsive to said relay signals;

a RC network connected intermediate said NAND gate and said inverting gate for delaying the receipt of said relay power-on signal by said inverting gate for a period of time; and a diode connected in parallel to said RC network for allowing immediate receipt of said relay power-off signal by said inverting gate.

7. The device of claim 1 wherein the power supply means comprises, a transformer connected to the power input means for stepping down the voltage;

a full-wave bridge rectifier connected to said transformer for rectifying the output of said transformer;

a capacitor connected to the output of said full-wave bridge rectifier for providing a first DC source;

a regulator connected to the output of said full-wave bridge rectifier for providing a second DC source;

a capacitor connected to said transformer for charging on the negative swing of said transformer; and a half-wave rectifier connected to said capacitor for providing a third DC source.

8. The device of claim 1 wherein the remote control means comprises, a remote transistor connected intermediate the computer interface means and the power control means for receiving a computer stay-on signal and sending a responsive power-on signal;

a protective network comprised of a resistor connected intermediate the computer interface and said remote transistor, a resistor connected in parallel with said transistor, and a diode connected in parallel with said remote transistor, for providing remote transistor protection; and a hysteresis network connected to the computer interface means for absorbing spurious signals from the computer interface means.

9. The device of claim 3 wherein the status sensor means comprises, a status inverting gate connected intermediate the power sensor means and the computer interface means for receiving a power-on signal from the power sensor means;

a parallel transistor connected intermediate said status inverting gate and the computer interface means for sending a status signal to the computer interface means;

a serial transistor connected intermediate said status inverting gate and the computer interface means for sending a status signal to the computer interface means;

a resistor connected intermediate said status inverting gate and said parallel transistor for providing voltage protection and isolation;

a resistor connected parallel with said parallel transistor to provide voltage division;

a resistor connected intermediate said parallel transistor and the power supply means to provide voltage pull-up;

a resistor connected intermediate said status inverting gate and said serial transistor to provide isolation;

a resistor connected intermediate said serial transistor and ground to provide voltage division;

a resistor connected intermediate said serial transistor and the computer interface means to provide voltage protection; and a resistor connected intermediate said parallel transistor and the power supply means to provide voltage pull-down.

10. The device of claim 3 wherein the inhibit means comprises, an inhibit transistor connected intermediate the computer interface means and said optical-isolator of the detection means for sending an inhibit signal to said optical-isolator responsive to a computer signal;

a resistor connected intermediate the power supply means and said inhibit transistor for keeping said inhibit transistor on in the absence of said computer signal;

a resistor connected intermediate the computer interface means and said inhibit transistor to provide voltage protection;

a resistor connected intermediate the computer interface means and the power supply means for providing voltage protection;

an inverting transistor connected intermediate the computer interface means and said inhibit transistor for inverting the computer signal sent to said inhibit transistor;

a jumper connected intermediate the computer interface means and said inhibit transistor and said reverse transistor for directing the computer signal to said inhibit transistor or to said inverting transistor;

a diode connected in parallel to said inverting transistor for shunting large voltages; and a resistor and diode network connected intermediate the computer interface and said inverting transistor for providing voltage protection.

11. A telephone activated power controller comprising:

a power input means for receiving electrical AC power;

a power output means connected to the power input means for supplying electrical AC power to output devices;

a telephone input means for receiving signals generated by outside telephonic systems;

a telephone output means for delivering telephonic signals to said output devices;

a power control means connected intermediate the power input means and the power output means for controlling the flow of power from the power input means to the power output means and for disrupting said power flow responsive to a power-on or power-off signal;

a detection means connected to the telephone input means, telephone output means, and the power control means for detecting a ring signal from the telephone input means or an off-hook condition from the telephone output means and for delivering a power-on signal to the power control means responsive to said ring signal or said off-hook condition and for providing a connection between the telephone input means and the telephone output means and for delivering a power-off signal to the power control means responsive to an on-hook condition from the telephone output means, the detection means including an RC load network connected to the ring line of the telephone input means for providing a ring load, a full-wave bridge rectifier connected to said RC load network and the tip line of the telephone input means for rectifying the ring signal and providing a current path for an off-hook condition signal, an optical-isolator connected across said full-wave bridge for receiving ring and off-hook condition signals from said full-wave bridge and for sending responsive power-on and power-off signals to the power control means, a low pass filter connected intermediate said optical-isolator andd the power control means for eliminating spurious signals, a limiting network comprised of a plurality of diodes connected in parallel to said optical-isolator and a resistor connected intermediate said optical-isolator and said diodes for limiting the current flow to said optical-isolator, a lock-out delay RC network connected to the power control means for receiving and delaying a relay control signal when the power output means have been powered up, a lock-out transistor connected to said lock-out relay for controlling said lock-out relay, a lock-out inverting gate connected intermediate said telephone delay RC network and said lock-out transistor for receiving said power-up signal and controlling said lock-out transistor responsive to said power up signal, and a diode connected in parallel to said telephone delay RC network for allowing immediate receipt of a relay control signal by said lock-out inverting gate; and a power supply means connected to the power input means for providing a plurality of power levels.

12. The device of claim 11 wherein the power supply means comprises, a transformer connected to the power input means for stepping down the voltage;

a full-wave bridge rectifier connected to said transformer for rectifying the output of said transformer;

a capacitor connected to the output of said full-wave bridge rectifier for providing a first DC source;

a regulator connected to the output of said full-wave bridge rectifier for providing a second DC source;

a capacitor connected to said transformer for charging on the negative swing of said transformer; and a half-wave rectifier connected to said capacitor for providing a third DC source.

13. The device of claim 12 further including, a computer interface means for allowing signals to pass between a computer and the device; and a remote control means connected to the computer interface means and the power control means for sending a power-on or power-off signal to the power control means responsive to a computer signal, comprised of a remote transistor connected intermediate the computer interface means and the power control means for receiving a computer stay-on signal and sending a responsive power-on signal, a protective network comprised of a resistor connected intermediate the computer interface and said remote transistor, a resistor connected in parallel with said remote transistor, and a diode connected in parallel with said remote transistor, for providing remote protection, and a hysteresis network connected to the computer interface means for absorbing spurious signals from the computer interface means.

14. The device of claim 13 further including, a sense power output means connected to the power input means for supplying electrical AC power to other devices such as units of a computer system; and a power sensor means connected intermediate the power input means and the sense output means for detecting the flow of power from the power input means to the sense power output means and for delivering a power-on signal to the power control means responsive to said flow of power and for delivering a power-off signal to the power control means response to the termination of said flow of power, comprised of an optical-isolator connected intermediate the power input means and the sense power output means for detecting the flow of power from the power input means to the sense power output means and for delivering a responsive power-on signal to the power control means, a limiting network comprised of a plurality of diodes connected parallel to said optical-isolator and a resistor connected intermediate said optical-isolator and said diodes, for limiting the current flow to said optical-isolator, a diode connected in parallel with said optical-isolator for limiting the voltage, a resistor connected parallel to said optical-isolator for setting a minimum current threshold for said optical-isolator, and a low-pass filter connected intermediate said optical-isolator and the power control means for limiting narrow transients.

15. The device of claim 14 further including, a status sensor means connected to the power supply means, the computer interface means, and the power sensor means for sensing a power-on signal from the power sensor means and delivering a status signal to the computer interface means, comprised of a status inverter gate connected intermediate the power sensor means and the computer interface means for receiving a power-on signal from the power sensor means, a parallel transistor connected intermediate said status inverting gate and the computer interface means for sending a status signal to the computer interface means, a serial transistor connected intermediate said status inverting gate and the computer interface means for sending a status signal to the computer interface means, a resistor connected intermediate said status inverting gate and said parallel transistor for providing voltage protection and isolation, a resistor connected parallel with said parallel transistor to provide voltage division, a resistor connected intermediate said parallel transistor and the power supply means to provide voltage pull-up, a resistor connected intermediate said status inverting gate and said serial transistor to provide isolation, a resistor connected intermediate said serial transistor and ground to provide voltage division, a resistor connected intermediate said serial transistor and the computer interface means to provide voltage protection, and a resistor connected intermediate said parallel transistor and the power supply means to provide voltage pull-down.

16. The device of claim 15 further including,
an inhibit means connected to the power supply means, the computer interface means, and the detection means for receiving an inhibit signal from the computer interface means and preventing the detection means from sending a power-on signal to the power control means, comprising of an inhibit transistor connected intermediate the computer interface means and said optical-isolator of the detection means for sending an inhibit signal to said responsive to a computer signal, a resistor connected intermediate the power supply means and said inhibit transistor for keeping said inhibit transistor on in the absence of said computer signal, a resistor connected intermediate the computer interface means and said inhibit transistor to provide voltage protection, a resistor connected intermediate the computer interface means and the power supply means for providing voltage protection, an inverting transistor connected intermediate the computer interface means and said inhibit transistor for inverting the computer signal sent to said inhibit transistor, a jumper connected intermediate the computer interface means and said inhibit transistor and said inverting transistor for directing the computer signal to said inhibit transistor or to said inverting transistor, a diode connected in parallel to said inverting transistor for shunting large voltages, and a resistor and diode network connected intermediate the computer interface and said inverting transistor for providing voltage protection.

17. The device of claim 16 further including,
a surge protection means connected intermediate the power input means and the power output means for limiting the amount of power flowing from the power input means, comprised of a fuse connected to the power input means to provide current protection, a plurality of varistors connected parallel to the power input means for providing voltage protection, and a choke inductor connected intermediate two of said varistors for providing current surge protection.

18. The device of claim 17 further including,
an indicator means connected to the power supply means, the power sensor means, the detection means and the remote control means for providing the user with a visual indication of whether the device is on or off and whether it the power output means were last turned on manually by the power sensor means or remotely by the detection means or remote control means, comprised of a LED for providing a visual signal, a flip-flop with set line connected to the power sensor means and the reset line connected to the detection means and the remote control means such that said flip-flop will output a disabling signal when it receives a power-on signal from the power sensor means and will output a blinking signal when it receives a power-on signal from the detection means or remote control means, an oscillator connected intermediate said flip-flop and said LED for emitting a steady state signal or an oscillating signal responsive to a disabling signal or a blinking signal respectively, a plurality of inverting gates connected in parallel intermediate said oscillator and said LED for controlling said LED, a resistor connected intermediate said LED and the power supply means for providing voltage protection, and a resistor connected intermediate said flip-flop and ground for setting said flip-flop in a steady state when poiwer is initially powered up.

19. The device of claim 18 further including,
a resistor connected parallel to the serial ground and the parallel ground of the computer interface for providing sufficient ground return so that the serial port of a computer will function and also for providing sufficient resistance to prevent damage to the parallel port of a computer.

20. A telephone activated power controller comprising:
a power input means for receiving electrical AC power;
a power output means connected to the power input means for supplying electrical AC power to the output devices;
a telephone input means for receiving signals generated by outside telephonic systems;
a telephone output means for delivering telephonic signals to said output devices;
a power control means connected intermediate the power input means and the power output means for controlling the flow of power from the power input means to the power output means and for disrupting said power flow responsive to a power-on or power-off signal;
a detection means connected to the telephone input means, telephone output means, and the power control means for detecting a ring signal from the telephone input means or an off-hook condition from the telephone output means and for delivering a power-on signal to the power control means responsive to said ring signal or said off-hook condition and for providing a connection between the telephone input means and the telephone output means and for delivering a power-off signal to the power control means responsive to an on-hook condition from the telephone output means, and the detection means comprising a RC load network connected to the ring line of the telephone input means for providing a ring load, a full-wave bridge rectifier connected to said RC load network and the tip line of the telephone input means for rectifying the ring signal and providing a current path for an off-hook condition signal, an optical-isolator connected across said full-wave bridge and for sending responsive power-on and power-off signals to the power control means, a low pass filter connected intermediate said optical-isolator and the power control means for eliminating spurious signals, a limiting network comprised of a plurality of diodes connected in parallel to said optical-isolator and a resistor connect intermediate said optical-isolator and said diodes for limiting the current flow to said optical-isolator, a lock-out relay connected intermediate said full-wave bridge and the tip line of the telephone output means for controlling the flow of current of the tip line to the telephone output means, a telephone delay RC network connected to the power control means for receiving and delaying a relay control signal when the power output means have been powered up, a lock-out transistor connected to said lock-out relay for controlling said lock-out relay, a lock-out inverting gate connected intermediate said telephone delay RC network and said lock-out transistor for receiving said relay control signal and controlling said lock-out transistor responsive to said relay control signal, and a diode connected in parallel to said telephone delay RC network for allowing immediate receipt of a relay control signal by said lock-out inverting gate; and a power supply means connected to the power input means for providing a plurality of power levels.

21. A telephone activated power controller comprising:

a power input means for receiving electrical AC power;

a power output means connected to the power input means for supplying electrical AC power to output devices;

a telephone input means for receiving signals generated by outside telephonic systems;

a telephone output means for delivering telephonic signals to said output devices;

a power control means connected intermediate the power input means and the power output means for controlling the flow of power from the power input means to the power output means and for disrupting said power flow responsive to a power-on or power-off signal;

a detection means connected to the telephone input means, telephone output means, and the power control means for detecting a ring signal from the telephone input means or an off-hook condition from the telephone output means and for delivering a power-on signal to the power control means responsive to said ring signal or said off-hook condition and for providing a connection between the telephone input means and the telephone output means and for delivering a power-off signal to the power control means responsive to an on-hook condition from the telephone output means;

a power supply means connected to the power input means for providing a plurality of power levels;

a computer interface means for allowing signals to pass between a computer and the controller;

a remote control means connected to the computer interface means and the power control means for sending a power-on or power-off signal to the power control means responsive to a computer signal;

a sense power output means connected to the power input means for supplying electrical AC power to other devices such as units of a computer system;

a power sensor means connected intermediate the power input means and the sense output means for detecting the flow of power from the power input means to the sense power output means and for delivering a power-on signal to the power control means responsive to said flow of power and for delivering a turn-off signal to the power control means responsive to the termination of said flow of power;

a status sensor means connected to the power supply means, the computer interface means, and the power sensor means for sensing a power-on signal from the power sensor means and delivering a status signal to the compututer interface means;

an inhibit means connected to the power supply means, the computer interface means, and the detection means for receiving an inhibit signal from the computer inerface means and preventing the detection means from sending a power-on signal to the power control means;

a surge protection means connected intermediate the power input means and the power output means for limiting the amount of power flowing from the power input means; and an indicator means connected to the power supply means, the power sensor means, the detection means and the remote control means for providing the user with a visual indication of whether the device is on or off and whether the power output means were last turned on manually by the power sensor means or remotely by the detection means or remote control means, the indicator means including an LED for providing a visual signal, a flip-flop with set line connected to the power sensor means and the reset line connected to the detection means and the remote control means such that said flip-flop will output a dsiabling signal when it receives a power-on signal from the power sensor means and will output a blinking signal when it receives a power-on signal from the detection means or remote control means, an oscillator connected intermediate said flip-flop and said LED for emitting a steady state signal or an oscillating signal responsive to a disabling signal or a blinking signal respectively, a plurality of inverter gates connected in parallel intermediate said oscillator and said LED for controlling said LED, a resistor connected intermediate said LED and the power supply means for providing current limiting protection, and a resistor connected intermediate said flip-flop and ground for setting said flip-flop in a steady state when power is initially powered up.

* * * * *